(12) United States Patent
Rost et al.

(10) Patent No.: US 10,704,689 B2
(45) Date of Patent: Jul. 7, 2020

(54) PARKING LOCK FOR A MOTOR VEHICLE

(71) Applicant: Schaeffler Technologies AG & Co. KG, Herzogenaurach (DE)

(72) Inventors: Markus Rost, Herzogenaurach (DE); Klaus Krämer, Lenkersheim (DE); Jochen Loeffelmann, Eggolsheim (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 21 days.

(21) Appl. No.: 16/097,295

(22) PCT Filed: Jun. 13, 2017

(86) PCT No.: PCT/DE2017/100496
§ 371 (c)(1),
(2) Date: Oct. 29, 2018

(87) PCT Pub. No.: WO2017/215709
PCT Pub. Date: Dec. 21, 2017

(65) Prior Publication Data
US 2019/0136973 A1    May 9, 2019

(30) Foreign Application Priority Data
Jun. 15, 2016  (DE) .......... 10 2016 210 662

(51) Int. Cl.
*F16H 63/34*  (2006.01)
*B60T 1/00*  (2006.01)

(52) U.S. Cl.
CPC .......... *F16H 63/3425* (2013.01); *B60T 1/005* (2013.01); *F16H 63/3466* (2013.01)

(58) Field of Classification Search
CPC ............ F16H 63/3416; F16H 63/3425; F16H 63/3433; F16H 63/3466; B60T 1/005; B60T 1/062
See application file for complete search history.

(56) References Cited

U.S. PATENT DOCUMENTS

| | | | | |
|---|---|---|---|---|
| 4,518,066 A | * | 5/1985 | Barr ........................ | B60T 1/005 188/31 |
| 6,164,427 A | * | 12/2000 | Ogawa ................... | B60T 1/005 192/219.5 |
| 2008/0169168 A1 | | 7/2008 | Nishimura | |

FOREIGN PATENT DOCUMENTS

| | | |
|---|---|---|
| DE | 29923633 U1 | 12/2000 |
| DE | 10040077 A1 | 3/2002 |

(Continued)

*Primary Examiner* — Richard M Lorence
(74) *Attorney, Agent, or Firm* — Kevin L. Parks

(57) ABSTRACT

A motor vehicle parking lock includes a locking pawl, an actuator shaft, a pawl actuating element and a crank mechanism. The locking pawl is pivotable about a first rotational axis and includes a pawl tooth configured for engagement in a recess of a locking tooth system in a positively locking manner. The actuator shaft is rotatable about a second rotational axis to actuate the locking pawl and reversibly bring the pawl tooth into engagement with the recess. The pawl actuating element is linearly moveable along a translation axis to pivot the locking pawl. The crank mechanism converts rotary motion of the actuator shaft into linear motion of the pawl actuating element. The crank mechanism includes a connecting rod with an articulation point at the pawl actuating element, and a joint that connects the connecting rod and a crank. The joint is arranged between the pawl tooth and the articulation point.

11 Claims, 4 Drawing Sheets

(56) References Cited

FOREIGN PATENT DOCUMENTS

| | | |
|---|---|---|
| DE | 102010053857 A1 | 6/2012 |
| DE | 102011080498 A1 | 2/2013 |
| EP | 1447291 A1 | 8/2004 |

\* cited by examiner

PARKING LOCK FOR A MOTOR VEHICLE

CROSS-REFERENCE TO RELATED APPLICATIONS

This application is the United States National Phase of PCT Appln. No. PCT/DE2017/100496 filed Jun. 13, 2017, which claims priority to German Application No. 102016210662.7 filed Jun. 15, 2016, the entire disclosures of which are incorporated by reference herein.

TECHNICAL FIELD

The disclosure relates to a parking lock for a motor vehicle.

BACKGROUND

A parking lock is known from DE 10 2010 053 857 A1. A similar solution is disclosed by DE 10 2011 080 498 A1. In the latter solution, a rolling planet transmission is used as a mechanical transmission element for transmitting the movement of the actuator to the locking pawl. This makes it possible to implement relatively high transmission forces.

When parking a vehicle, e.g. on a slope, the vehicle weight produces a force on the closed pawl and thus, in turn, on the parking lock mechanism, depending on the wheel diameter, the transmission ratio and the radius of the locking wheel (locking tooth system). When unlocking the parking lock on the slope, this applied force must thus be overcome. Since the aim is to make the actuator as small as possible in respect of power and of current consumption, so that the actuator can still be operated with the voltage and current consumption of the onboard battery in an emergency, only a restricted unlocking force is available. This, in turn, can only be increased to a limited extent by means of the transmission ratio since otherwise the required actuating travels of the mechanism are not sufficient.

To disengage the locking pawl, i.e. to move the latter into the unlocked position, a parking may thus require a relatively large force. This can be obtained from the relative geometry of the pawl tooth and the recess in the locking tooth system, namely by means of a corresponding undercut angle. A high force can also be obtained by virtue of the friction conditions and the friction wedge achieved.

In the solution according to the cited DE 10 2011 080 498 A1, it is admittedly possible to achieve high transmission forces in order to move the locking pawl, especially from the locked position into the unlocked position. However, the construction of this solution is relatively complex and thus expensive. Furthermore, the arrangement disadvantageously has a relatively high weight.

To overcome this disadvantage, US 2008/0169168 A1 discloses the practice of implementing the actuation of the parking lock with a crank mechanism. When the automatic selector lever is placed in the parking position, the movement determined by the driver is implemented. The preset construction requires a large number of components and a considerable installation space, especially axial installation space.

BRIEF SUMMARY

A crank mechanism includes a crank and a connecting rod, which are connected to one another in an articulated fashion (in the manner of a hinge, for example). In this case, the articulated connection between the crank and the connecting rod can include a rolling bearing, e.g., a needle bearing. However, it is also possible for the articulated connection between the crank and the connecting rod to be designed as a sliding bearing.

By virtue of the arrangement of the joint connecting the crank and the connecting rod axially between the pawl tooth and the articulation point of the connecting rod on the pawl actuating element, the parking lock is of compact construction. The axial nesting thus saves installation space along the length of the connecting rod arm.

The articulated connection, designed as a hinge, between the crank and the connecting rod has a pivoting axis, wherein a right angle is obtained between the pivoting axis and the rotational axis when the pivoting axis is projected onto the rotational axis of the locking pawl. As a result, the parking lock housing can be short in a tangential direction with respect to the parking lock wheel.

The distance between the locations at which the connecting rod is attached in an articulated fashion may be at least twice the distance and, in an example embodiment, at most six times the distance that exists between the rotational axis of the actuator and the pivoting axis between the crank and the connecting rod. By virtue of the unequal lengths, the transmission ratio is, on the one hand, modified. On the other hand, and more significantly for the compactness of the parking lock, a short crank requires less installation space in the direction of the axis of the parking lock wheel.

The transmission element may include a cage, in which a plurality of rollers, e.g., three rollers, is/are mounted, wherein the cage is rigidly connected to the pawl actuating element of the transmission element which is moved by the crank mechanism.

The rollers may be designed as rolling bearings. For low-friction running, it is sufficient if the rollers not in direct contact with the locking pawl are designed as rolling bearings.

The locking pawl may have a ramp for one of the rollers to run up.

The connection between the cage and the pawl actuating element of the transmission element may be designed as a rod. In one embodiment, the rod is sheathed by a helical spring, which preloads the parking lock pawl, thus ensuring locking even in the deenergized state.

The compactness of the parking lock can be further increased if the rotational axis of the locking pawl, the rotational axis of the actuator shaft and the translation axis of the pawl actuating element are each arranged orthogonally with respect to one another. The fact that each transmission of the torque likewise changes the direction of movement in three dimensional space ensures the compactness of the arrangement. This effect is also obtained, though to a lesser extent, if only two spatial directions are used or if there is not a change in the axis of the direction of movement in each transmission component of the parking lock but only in the case of some of the transmission components.

In one embodiment, the locking pawl is of longer design, when viewed in the direction of the translation axis of the pawl actuating element, than the pawl actuating element together with the rollers. As a result, the overall actuating unit is of shorter construction in the direction of the translation axis of the pawl actuating element than the mechanism required for positive locking, and therefore a parking lock designed in this way does not require additional installation space in this spatial direction.

If the maximum distance between the pivoting axis (b) and the translation axis is smaller than twice the width of the locking pawl (4), the parking lock is also compact in the axial direction of the parking lock wheel. In one embodiment, the movement of the joint between the connecting rod and the crank is through a maximum of 45°, and possibly a maximum of 30°. As a result, less installation space is also taken up transversely to the translation axis of the pawl actuating element. In one embodiment, the required installation space is smaller than three times the thickness of the connecting rod.

In an example embodiment, the crank and the connecting rod are connected to one another exclusively by the joint. As a result, the connecting rod and the crank are easy to produce. The absence of recesses means that there is no weakening of the components, and the selected length of the crank can be so short that the rotational axis of the actuator shaft and the pivoting axis are close together.

The disclosed device may be used with automatic transmissions of motor vehicles and with electric vehicles. The parking lock may be actuated electrically using an electric motor as an actuator.

The disclosed device employs a crank mechanism to convert the motion of the actuator into pivoting of the locking pawl. At the beginning of unlocking, the crank mechanism initially brings about only a small movement, but this takes place with a relatively high force. After the undercut between the pawl tooth of the locking pawl and the recess in the locking tooth system has been overcome (which requires high forces), the crank mechanism then brings about a relatively large movement, although this takes place with a relatively small force. This travel enables the unlocking process to be carried out reliably, and a high force is then no longer required.

The disclosed device uses the property of a crank mechanism according to which there is a high force with little travel at the beginning of the movement but there is then a large adjustment travel with a low force.

With the design proposed, a small and lightweight drive for the parking lock is capable of applying high forces where they are required.

BRIEF DESCRIPTION OF THE DRAWINGS

An illustrative embodiment of the invention is shown in the figures, in which.

DETAILED DESCRIPTION

Figure 1:
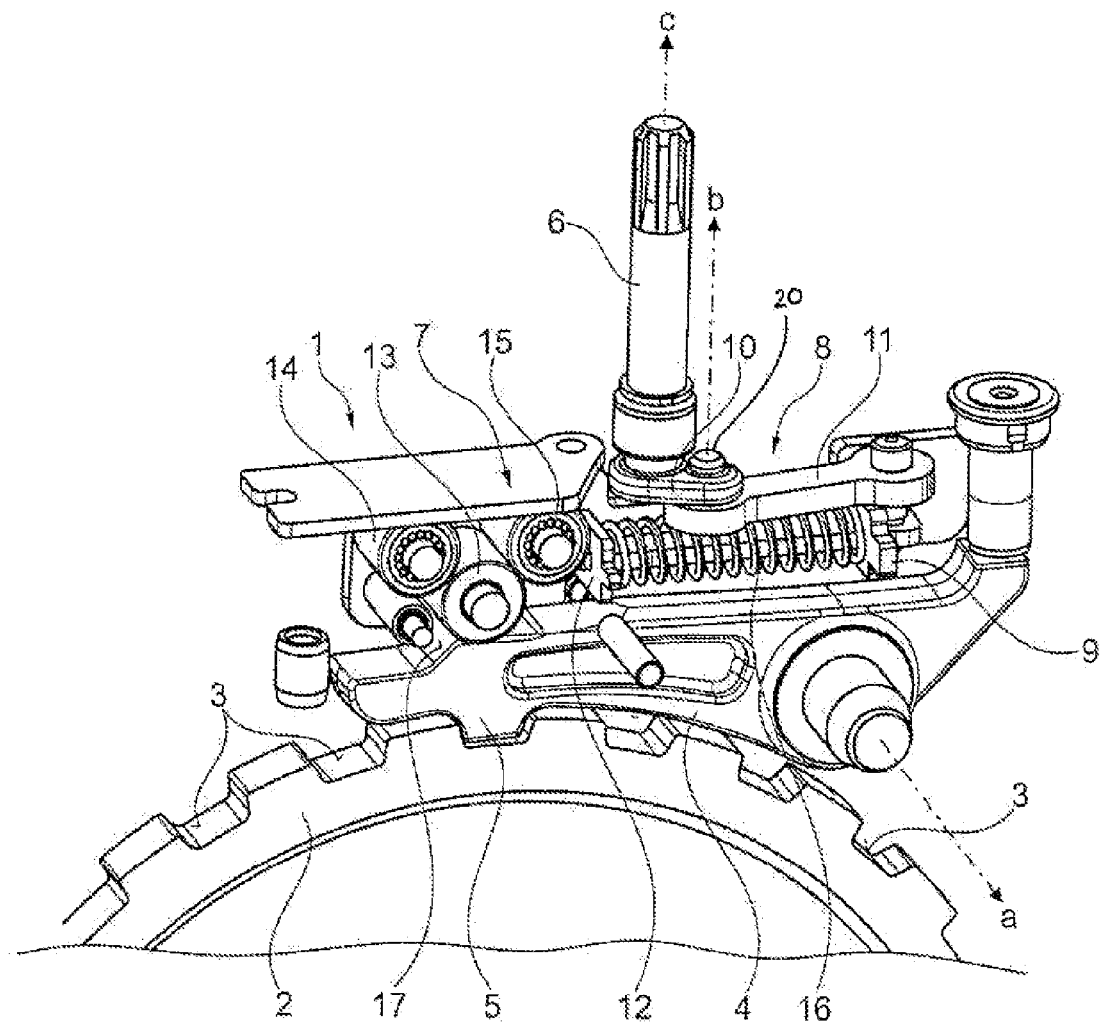
FIG. 1 shows the essential components of a parking lock in a perspective view, wherein said lock is in the locked position.
Figure 2:
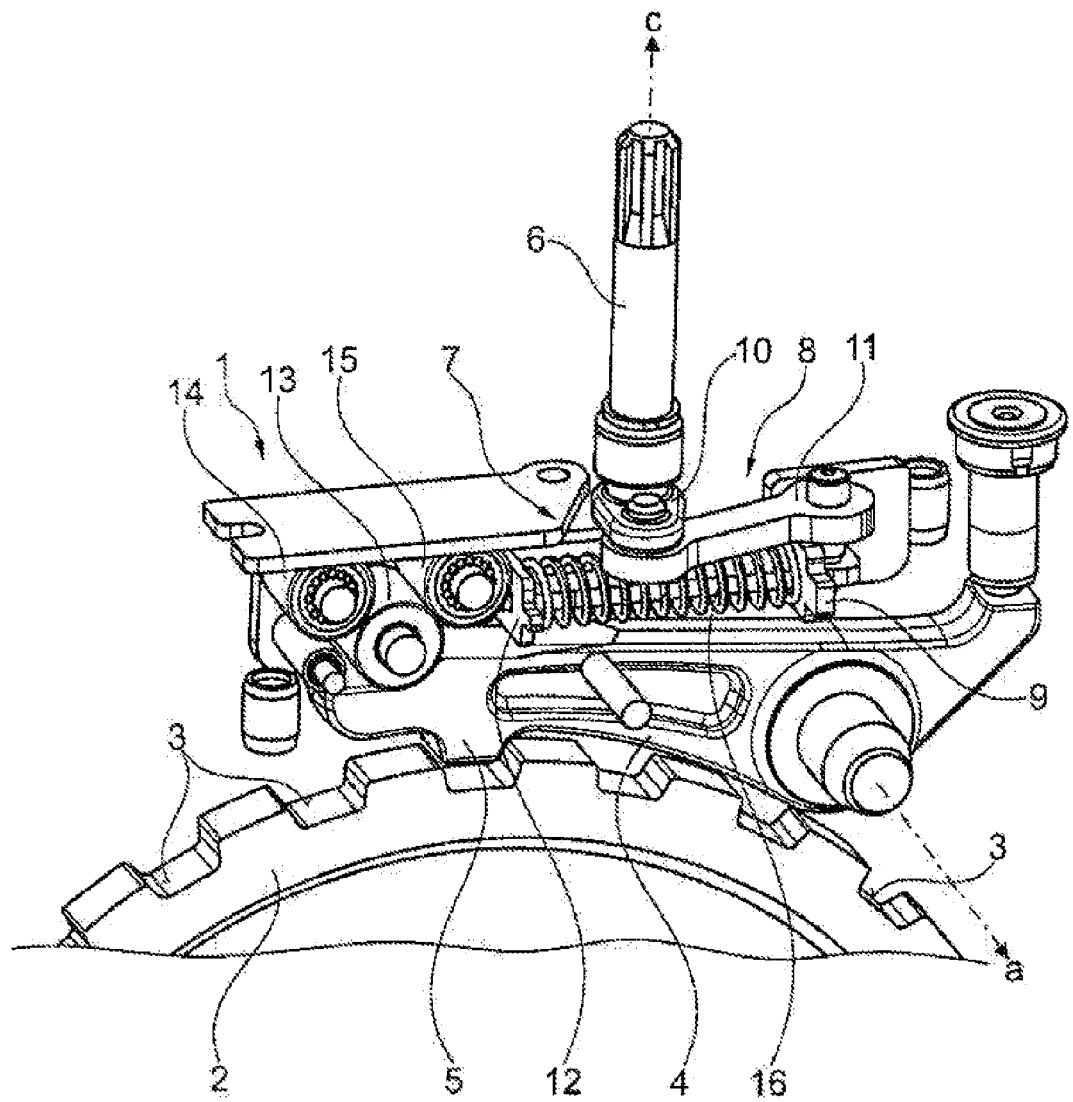
FIG. 2 shows the parking lock in the unlocked position in the illustration according to FIG. 1.
Figure 4:
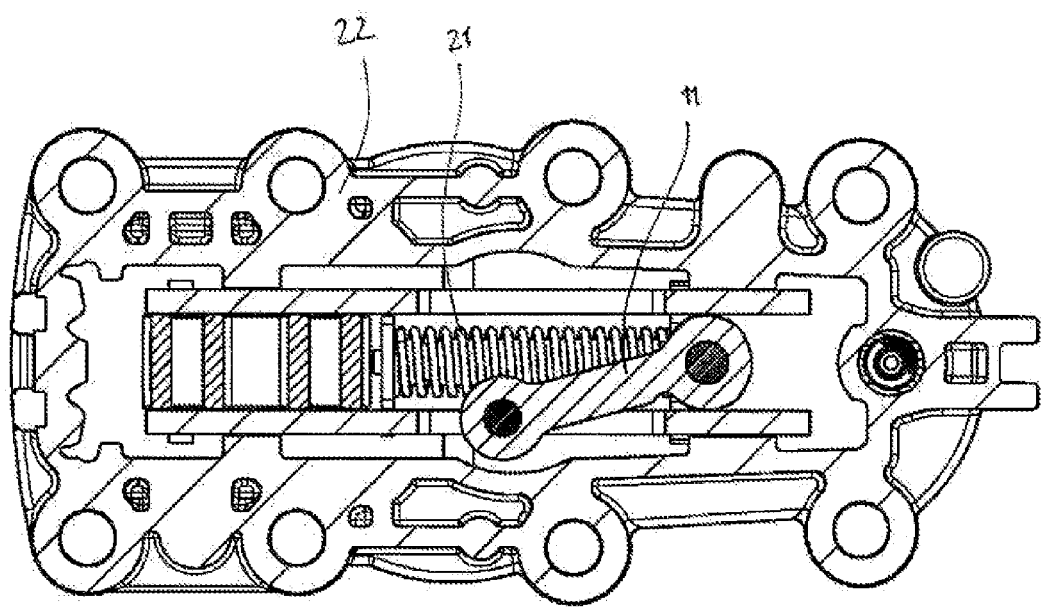
FIG. 4 shows a longitudinal section through a parking lock according to the invention with a housing.

FIGS. 1, 2 and 4 show a parking lock 1, wherein only some parts are illustrated. Covers and attachment components of the arrangement have been omitted for reasons of clarity. Relevant features based on a fundamental construction concept of a parking lock, as explained in detail in the abovementioned DE 10 2010 053 857 A1 and DE 10 2011 080 498 A1 by the applicant, are described below. To this extent, explicit reference is made to these previously known designs in order to avoid repetitions as regards the fundamental operating principle of a parking lock.

The parking lock 1 is part of a parking lock device having a locking tooth system 2 of a parking lock wheel. The locking tooth system 2 has a number of recesses 3 on the circumference thereof. Another component of the parking lock 1 is a locking pawl 4, which is arranged in such a way that it can be pivoted about a rotational axis a.

FIG. 1 shows the locking pawl 4 in a position oriented downward (in the direction of the locking tooth system 2), in which a pawl tooth 5 of the locking pawl 4 engages in one of the recesses 3 of the locking tooth system 2 and thus locks the arrangement.

Meanwhile, FIG. 2 shows the locking pawl 4 in a position oriented upward (in a direction away from the locking tooth system 2), in which the pawl tooth 5 of the locking pawl 4 does not engage in a recess 3; here, therefore, the parking lock 1 is unlocked.

The locking and unlocking of the parking lock 1 is performed by means of an actuator shaft 6, which rotates about a rotational axis c for locking and unlocking. The actuator shaft 6 is part of an electric actuator.

The transmission of the motion of the actuator shaft 6 to the locking pawl 4 is accomplished by means of a transmission element 7. As in the cited mechanisms, the transmission element 7 includes a cage 12 which can be moved in a linear manner and in which three rollers 13, 14 and 15 are mounted.

In this case, the roller 13 can contact ramp 17 (see FIG. 1), which is formed on the locking pawl 4. Upon linear motion of the cage 12—cf. the two positions of the cage 12 and of the rollers 13, 14, 15 in FIGS. 1 and 2—the locking pawl 4 is therefore pivoted.

This is described in greater detail in connection with the devices mentioned in the applications cited above, and therefore attention is drawn to these documents.

In the present case, transmission element 7 includes a crank mechanism 8, by means of which a pawl actuating element 9 of the transmission element 7 can be moved in a linear manner.

A rod 16 is arranged between the pawl actuating element 9 and the cage 12, with the result that a linear motion of the pawl actuating element 9 is transmitted to the cage 12. Here, the crank mechanism 8 has a crank 10 and a connecting rod 11, which are connected to one another in an articulated fashion. The crank 10 is connected for conjoint rotation to the actuator 6. The connecting rod 11 is connected in an articulated fashion to the pawl actuating element 9.

If the actuator of the actuator shaft 6 is then operated, i.e. if there is a rotation about the axis c, the crank 10 accordingly moves and pulls the connecting rod 11 along with it.

Crank mechanism 8 makes it possible initially to achieve a large force for unlocking with the same small torque applied to the actuator, without reducing the total actuating travel. With an increasing actuating angle or travel, the force then decreases, but this is not disruptive since a large force is only required at the outset until (in this case) the roller 13 has reached the high point of the ramp 17 of the locking pawl 4 and the locking of the locking pawl by the roller 13 has thus been canceled.

As can be seen from FIG. 1, the pivoting axis b of the hinge-like connection between the crank 10 and the connecting rod 11 points in the vertical direction, while the rotational axis a of the locking pawl 4 points in the horizontal direction. Accordingly, if the pivoting axis b is projected onto the rotational axis a, these two axes are aligned at right angles to one another.

Figure 3:
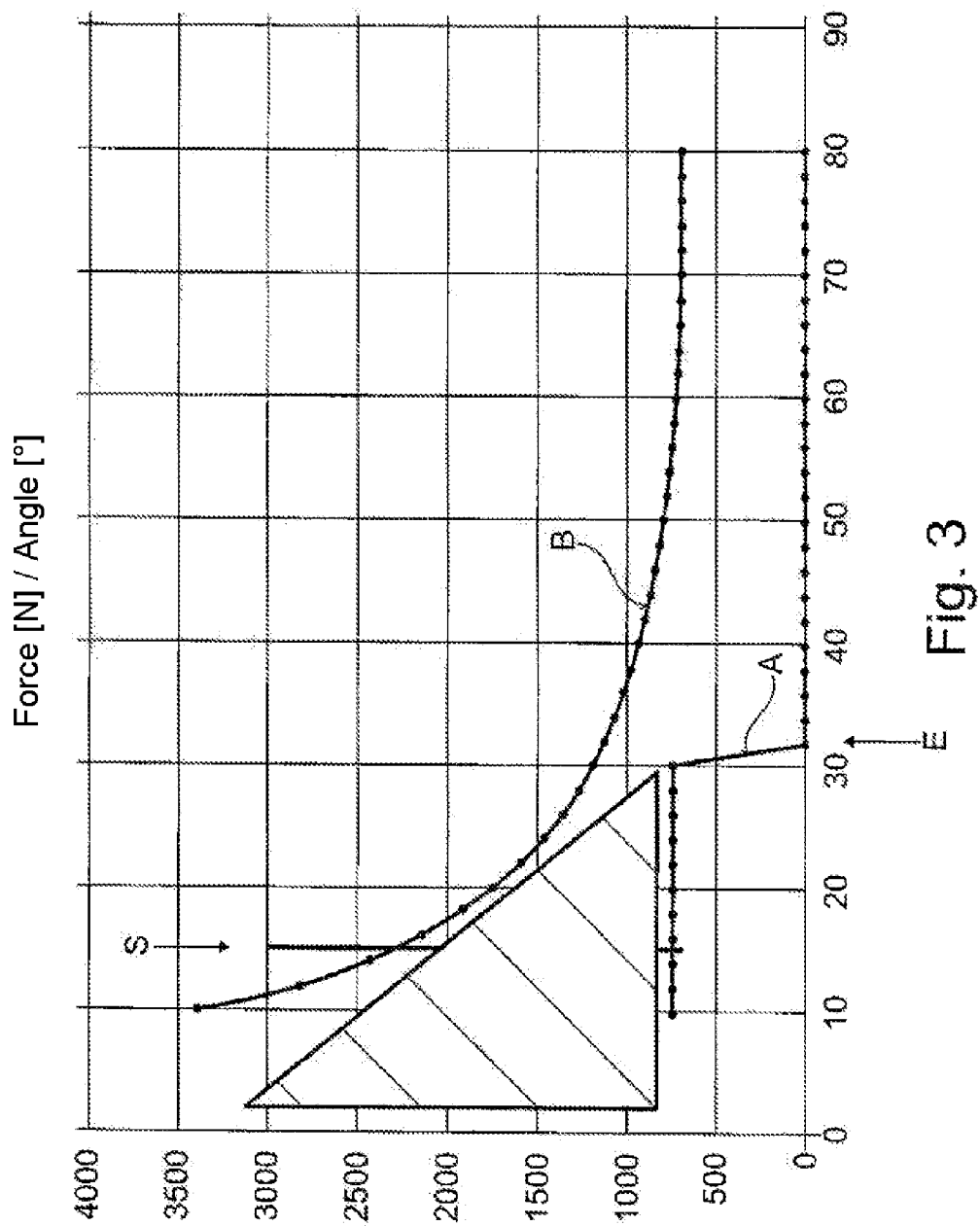
FIG. 3 shows the variation in the force produced by a crank mechanism of the parking lock and the force required for the unlocking process against the sequence of movement of the unlocking process.

The variation of the force produced by the crank mechanism 8 of the parking lock 1 and that of the force required for the unlocking process are shown diagrammatically against the sequence of motion of the unlocking process in FIG. 3.

Curve A shows the variation of the required force to carry out the unlocking process, i.e. to pull the pawl tooth 5 of the locking pawl 4 out of the recess 3 of the locking tooth system 2.

Curve B shows the variation of the force which can be produced with the crank mechanism 8. Respective forces in Newtons are given on the ordinate, and the rotational travel of the actuator shaft 6 in degrees of angle is shown on the abscissa.

The unlocking process starts in position S at an angular position of about 15° of the actuator shaft 6. In position E, at an angular position of somewhat over 30° of the actuator shaft 6, the unlocking process is complete. From this position onward, the freed locking pawl 4 is then only pulled out of the collision zone of the locking tooth system 2, for which purpose only minimal forces are then required.

As can be seen, the force produced by the crank mechanism 8 is larger over the entire unlocking process than is required for the unlocking process; this is indicated by the highlighted hatched triangular area in FIG. 3.

Accordingly, a sufficient unlocking force is available with the crank mechanism 8, even in the case of a lightweight and small design of the transmission element 7.

In the present case, the crank 10 is designed as a component with a trioval cross section which has a triangular contour with rounded corners.

REFERENCE NUMERALS

- 1 parking lock
- 2 locking tooth system
- 3 recess
- 4 locking pawl
- 5 pawl tooth
- 6 actuator shaft
- 7 transmission element
- 8 crank mechanism
- 9 pawl actuating element
- 10 crank
- 11 connecting rod
- 12 cage
- 13 roller
- 14 roller
- 15 roller
- 16 rod
- 17 ramp
- 20 joint
- 21 spring
- 22 housing
- a rotational axis of the locking pawl
- b pivoting axis of the connection between the crank and connecting rod
- c rotational axis of the actuator
- d translation axis of the pawl actuating element

The invention claimed is:

1. A parking lock for a motor vehicle comprising:
    a first rotational axis;
    a locking pawl pivotable about the first rotational axis and comprising:
        a pawl tooth configured for engagement in a recess of a locking tooth system in a positively locking manner;
    a second rotational axis;
    an actuator shaft rotatable about the second rotational axis to actuate the locking pawl and reversibly bring the pawl tooth into engagement with the recess;
    a pawl actuating element, linearly moveable along a translation axis to pivot the locking pawl; and, a crank mechanism arranged to convert rotary motion of the actuator shaft into linear motion of the pawl actuating element and comprising:
        a crank;
        a connecting rod comprising an articulation point at the pawl actuating element; and,
    a joint:
        connecting the crank and the connecting rod; and,
        arranged between the pawl tooth and the articulation point when viewed in a direction of the translation axis.

2. The parking lock of claim 1 wherein:
    the joint comprises a pivoting axis; and,
    the pivoting axis and the first rotational axis are at a right angle when the pivoting axis is projected onto the first rotational axis.

3. The parking lock of claim 2 wherein the second rotational axis and the pivoting axis are arranged parallel to one another.

4. The parking lock of claim 2 further comprising:
    a first distance between the articulation point and the joint; and,
    a second distance between the second rotational axis and the pivoting axis, wherein the first distance is at least twice the second distance.

5. The parking lock of claim 2 wherein a maximum distance between the pivoting axis and the translation axis is less than twice a width of the locking pawl.

6. The parking lock of claim 1 wherein the first rotational axis, the second rotational axis, and the translation axis are each arranged orthogonal with respect to one another.

7. The parking lock of claim 1 further comprising a transmission element, wherein:
    the transmission element comprises:
        the pawl actuating element;
        a cage rigidly connected to the pawl actuating element; and,
        a plurality of rollers mounted in the cage.

8. The parking lock of claim 7 wherein the transmission element further comprises:
    a rod connecting the cage and the pawl actuating element; and,
    a helical compression spring surrounding the rod to preload the rod.

9. The parking lock of claim 8 wherein a length of the locking pawl is greater than a length of the transmission element in a direction of the translation axis.

10. The parking lock of claim 1 further comprising an electric motor to drive the actuator shaft.

11. The parking lock of claim 1 wherein the crank and the connecting rod are only connected by the joint.

* * * * *